Feb. 25, 1930.  J. L. DRAKE  1,748,115
PROCESS AND APPARATUS FOR PRODUCING SHEET OR PLATE GLASS
Filed March 31, 1926   3 Sheets-Sheet 1
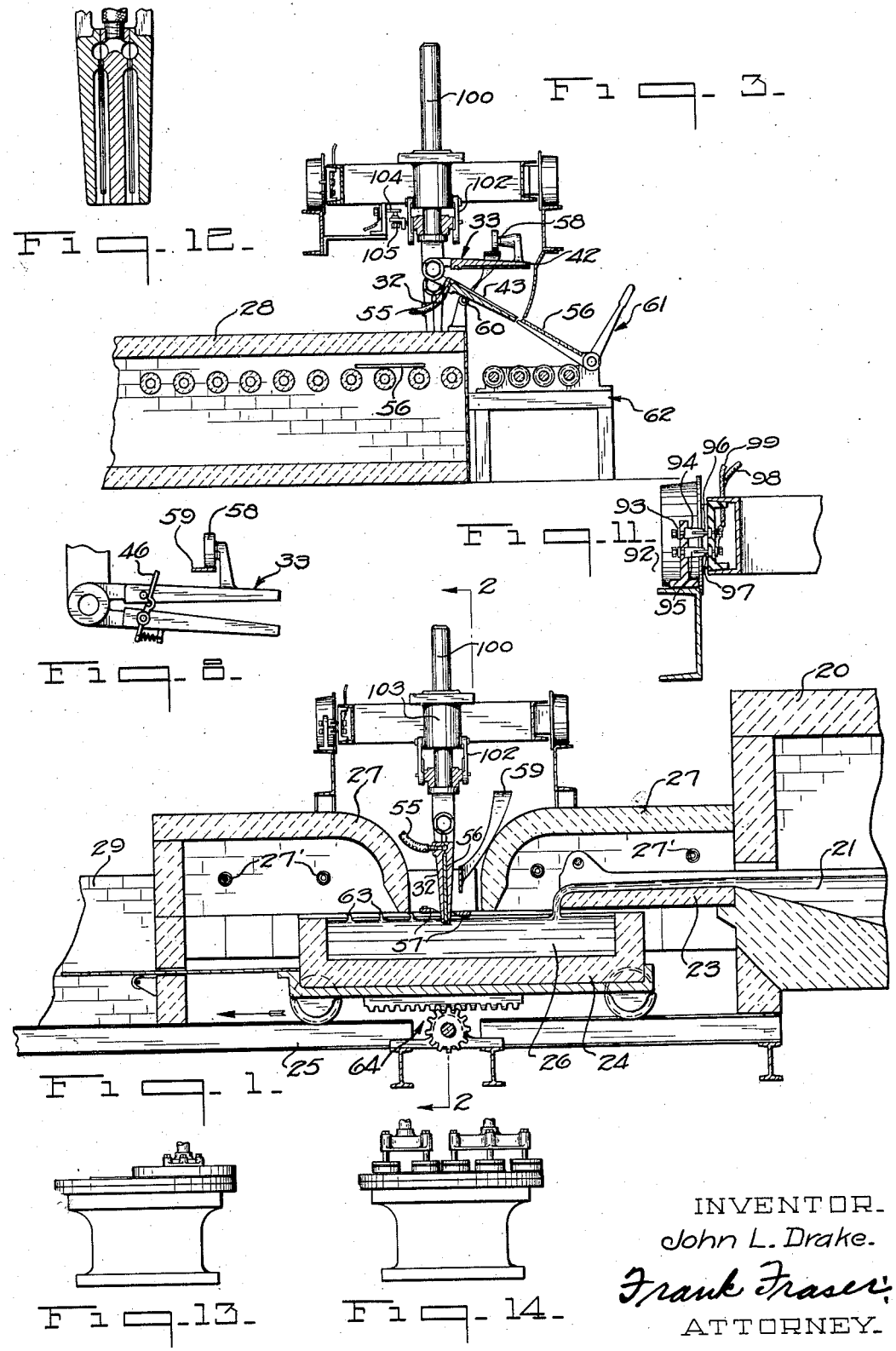
INVENTOR.
John L. Drake.
Frank Fraser
ATTORNEY.

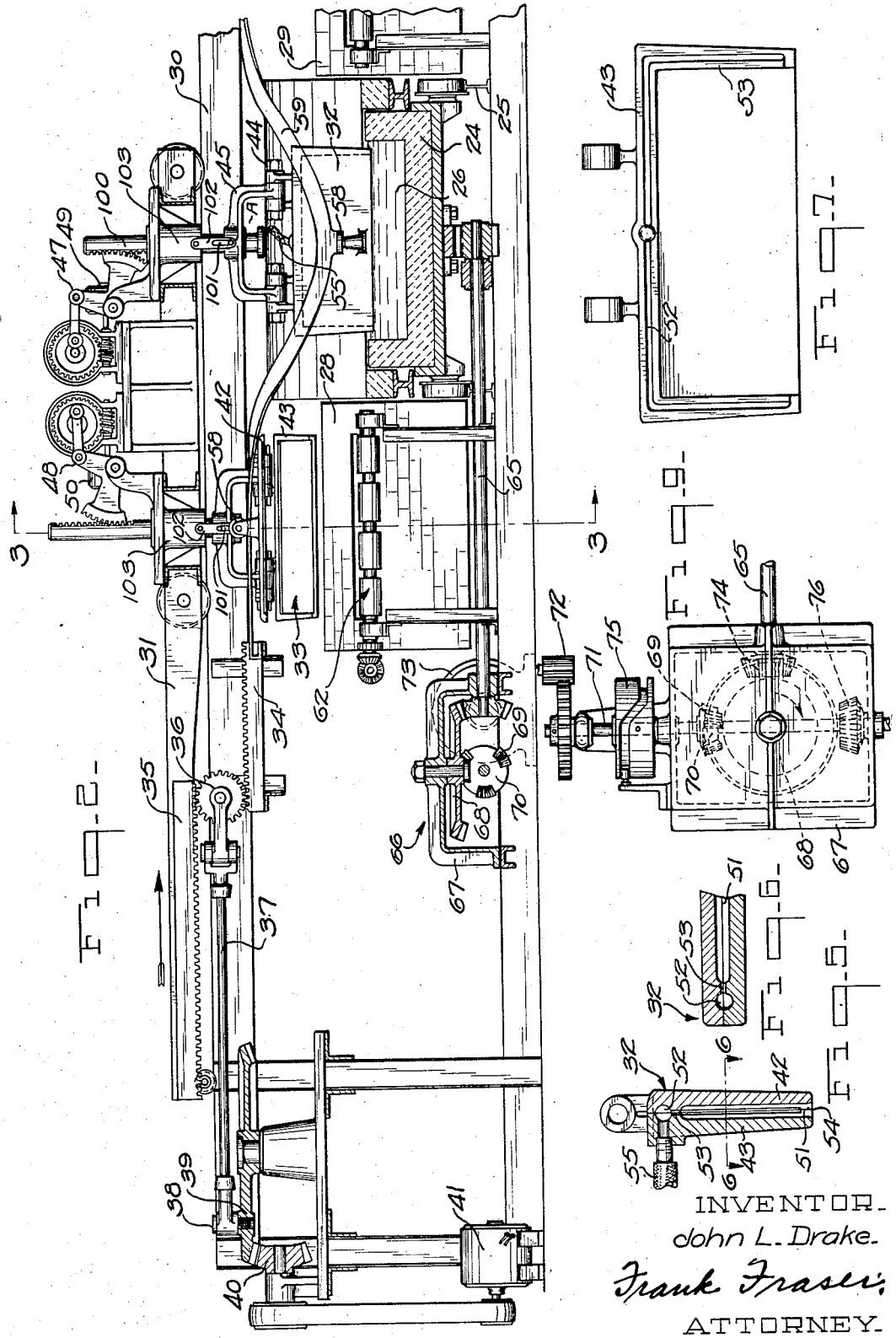

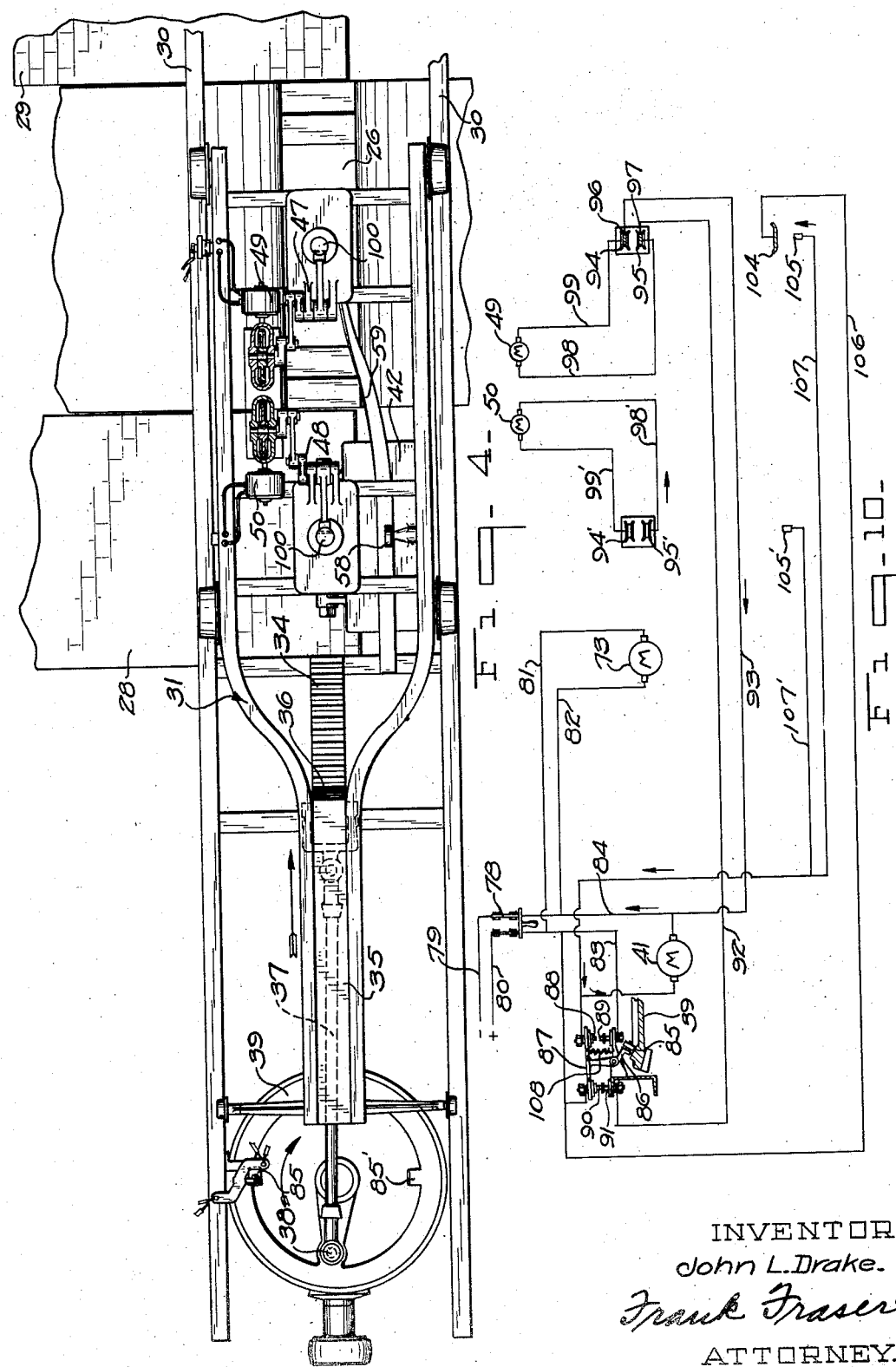

Patented Feb. 25, 1930

1,748,115

UNITED STATES PATENT OFFICE

JOHN L. DRAKE, OF TOLEDO, OHIO, ASSIGNOR TO LIBBEY-OWENS GLASS COMPANY, OF TOLEDO, OHIO, A CORPORATION OF OHIO

PROCESS AND APPARATUS FOR PRODUCING SHEET OR PLATE GLASS

Application filed March 31, 1926. Serial No. 98,712.

The present invention relates to a process and apparatus for forming sheet or plate glass.

An important object of the invention is to provide an apparatus with means whereby sheets of glass may be formed by atmospheric pressure from a mass of molten glass.

Another object of the invention is to provide a plurality of traveling molds with suitable means whereby they may be adapted to pick up, from a receptacle containing molten glass, charges of said molten glass, and to further provide said molds with means for forming sheets of glass from said charges of molten glass.

Another object of the invention is to provide a mold adapted to form sheets of glass therein with means whereby the glass sheets formed will be formed by the pressure of the atmosphere on the source of molten glass from which the glass sheets are produced.

A further object of the invention is to provide a member adapted with means to suck up charges of a contained mass of molten glass, and means which will permit the molten glass being sucked up to distribute itself evenly and uniformly in sheet form in all directions within said member.

A still further object of the invention is to provide an apparatus with means for automatically forming glass sheets by suction, and then delivering them when formed to an annealing leer.

Other objects and advantages of the invention will become apparent during the course of the following description.

In the drawings wherein like numerals are employed to designate like parts throughout the same, Fig. 1 is a sectional elevation of the apparatus, Fig. 2 is an elevation taken substantially on line 2—2 in Fig. 1, Fig. 3 is a sectional elevation taken substantially on line 3—3 in Fig. 2, Fig. 4 is a plan view of the apparatus, Figs. 5 and 6 are enlarged detail views of the sheet forming member shown in operation in Figs. 1, 2 and 3, Fig. 7 is a view taken substantially on line 7—7 in Fig. 5, showing one-half of the sheet forming member, Fig. 8 is a detail view showing a locking mechanism used in connection with the sheet forming members, Fig. 9 is a plan view of a shifting mechanism used in connection with the molten glass container shown in Fig. 1, Fig. 10 is a wiring diagram of the apparatus, Fig. 11 is a detail view of electrical connections for use in the apparatus, Fig. 12 is a modification of the sheet forming members shown in Fig. 5, and Figs. 13 and 14 are diagrammatic views of surfacing units which may be used in connection with the present invention.

Referring to the drawings in detail, the numeral 20 refers to a glass tank furnace containing molten glass 21 and provided with a discharge spout 23, suitable for supplying a movable working receptacle 24, mounted on a track 25, with a supply of molten glass 26. The discharge spout 23 and receptacle 24 are preferably provided with a suitable covering 27, heated by burners 27'.

It is the object of the present invention to form glass sheets from the molten glass 26 with the apparatus illustrated in the drawings, which automatically deliver them, when formed, into suitable annealing leers. It is to be understood that this method of forming glass sheets is not necessarily limited to the construction shown in the drawings, as many different constructions embodying the present invention may be designed for accomplishing the same or substantially the same results.

In accordance with the construction shown in the drawings, there are positioned in close proximity to the receptacle 24, annealing leers 28 and 29. Mounted on a suitable structure and elevated above the working receptacle and leers is a track 30 upon which is supported the carriage 31, carrying a plurality of members or molds 32 and 33. The carriage 31 is adapted to reciprocate back and forth on the track 30, and thus carry the molds 32 and 33 to and from the working receptacle 24 and their respective leers 28 and 29, by virtue of the stationary rack 34, the rack 35 attached to the carriage 31, a cooperating pinion 36, suitably connected by a pitman 37 to the crank pin 38 secured in the bevel gear 39 and driven by a pinion 40, preferably connected in some suitable manner to an electric motor 41.

The members 32 and 33 are ordinarily identical in design; therefore, the description of one will be considered sufficient for both. They are preferably constructed of non-corrosive metal such as nichrome, monel, stellite, or the like, or they may be also constructed of ordinary cast iron. The molds comprise two separable halves 42 and 43, as clearly illustrated in the enlarged details thereof, shown in Figs. 5, 6 and 7. These two halves are preferably hinged together by bolts 44 to a yoke 45, and when in closed position are locked by a suitable locking mechanism 46 shown in Fig. 8.

When in operating position with the working receptacle, the members 32 and 33 depend vertically from the yoke 45, and are adapted to be raised and lowered to and from the molten glass in the receptacle by their respective raising and lowering mechanisms 47 and 48, which are preferably operated by separate electric motors 49 and 50, as shown in Figs. 2 and 4. The mold halves 42 and 43 of the members 32 and 33 are recessed in such a manner to form, when in closed position, a compartment 51 suitable for molding sheets of glass therein. Arranged at the edges of the said members or molds and substantially surrounding the compartment 51 is a manifold or suction chamber 52, which communicates with the compartment 51 by a slotted passageway 53, which is only a few thousandths of an inch in thickness.

It is the particular purpose of this invention to form within the compartment 51 a sheet of glass by the atmospheric pressure on the mass of molten glass 26. This is done by suitably dipping the open end 54 of said members into the molten glass and exhausting the air from the compartment 51 by connecting to its manifold 52 a suitable vacuum line 55. The molten glass may then enter the compartment 51 under the pressure of the atmosphere on the surface of the molten glass 26, and thus form a sheet of glass 56. Owing to the fact that the compartment 51 is substantially surrounded by a suction manifold 52, it is possible to exhaust the air therefrom in substantially equal proportions throughout, and it is therefore obvious that the glass entering this compartment may equally distribute itself accordingly in sheet form.

The glass sheet is then raised with the mold and sheared from the molten glass by a pair of suitably operated shears 57, and then by causing the carriage 31 to move in the direction indicated by the arrow in Fig. 2, the mold 32 is gradually swung from its vertical position into a horizontal position by reason of its guide roller 58, being caused to follow a cam track 59, as shown in Fig. 2. When in this horizontal position, the vacuum is released from the vacuum line 55, and the mold locking mechanism 46 is tripped in some suitable manner, thus permitting the lower half 43 of the mold to swing down with the sheet until striking a knock-out bar 60, which immediately causes the sheet to slide therefrom onto a transferring mechanism 61, as shown in Fig. 3. This transferring mechanism, when lowered by an operator, places the sheet onto a leer charging mechanism 62. It will be apparent by referring to Fig. 2 of the drawings, that while one mold is forming a sheet of glass, the other mold is simultaneously discharging its sheet therefrom to the transferring mechanism 61.

After the formation of each sheet and the shearing thereof from the molten glass 26, there remains on the surface of the molten glass a sheet meniscus 63. In order to move this thus formed sheet meniscus 63 out of the path of the succeeding mold entering the receptacle, the receptacle is indexed along its track after each sheet forming operation by having associated therewith a rack and pinion drive 64. The receptacle is indexed or shifted along the track 25 by connecting the pinion shaft 65 to a shifting mechanism 66, as shown in Fig. 2. A plan view of the shifting mechanism is clearly shown in Fig. 9. It preferably comprises a frame work 67 in which is supported a follower gear 68 normally intermittently driven by the pinion 69 having suitably arranged therein blank spaces 70, and mounted on a slidable driving shaft 71 connected by a suitable gearing 72 to an electric motor 73. Meshing with and driven by the follower gear 68 is a second pinion 74 which is connected to the rack pinion shaft 65. The pinion 69, when rotated, causes the receptacle 24 to be fed or indexed along the track 25 in the direction indicated by the arrow in Fig. 1, in proper cadence with the reciprocatory carriage 31 carrying the molds 32 and 33. When the receptacle reaches the extent of its travel in the direction of the just mentioned arrow, a suitably designed cam 75, mounted on the slidable driving shaft 71, causes the pinion 69 to become disengaged from the follower gear 68, and simultaneously causes a pinion 76, also mounted on the shaft 71, to mesh therewith. This immediately reverses the direction of rotation of the follower 68, and thus causes the receptacle to likewise travel in reverse direction, and thus return to its initial position, after which the cam 75 causes the pinion 71 to shift back into its operating position with the follower 68, and the receptacle is then ready for the next cycle of operations. By this time the sheet meniscuses 63, formed on the surface of the molten glass 26 in the receptacle 24, have been sufficiently reheated to cause them to settle down to the normal glass level in the receptacle.

When the molds are constructed of non-corrosive metal, such as monel, nichrome or stellite, and the surfaces of the compartment 51 have been properly machined and polished, it is believed that the sheet of glass formed therein will be flat, have a high luster and be substantially equal in thickness throughout, and after being annealed will be ready for commercial use. Molds made of such material will be somewhat expensive and it may be considered advisable to construct them of ordinary cast iron, giving no particular attention to the condition of the surfaces of its sheet forming compartment 51, except that the sides thereof be relatively flat and parallel. The sheets formed in ordinary cast iron molds will probably have roughened or mottled surfaces, and in that event will have to be ground down to a true and common level by placing them on a suitable grinding apparatus, as shown in Fig. 13, and then subjecting them to a polishing operation on the apparatus illlustrated in Fig. 14.

The modification shown in Fig. 12 is that of one of the molds showing a manner in which a multiple mold may be designed for simultaneously forming a plurality of sheets in one operation.

The operations of the invention may be more clearly understood in detail by referring to the wiring diagram shown in Fig. 10. The apparatus will be considered starting from a position shown in Figs. 2 and 4, switch 78 in closed position, the carriage 31 stationary, and a sheet of glass being formed in the mold 32, the mold 33 having just discharged its sheet of glass 56 onto the transferring device 61. There is at this time a completed electrical circuit from the mains 79 and 80 through the wires 81 and 82 to the receptacle shifting motor 73, which motor is normally in continuous operation. A circuit through the wires 83 and 84 to the motor 41, that operates the carriage 31 by the rotation of the bevel gear 39, has momentarily been opened, by the cam block 85 on said bevel gear, causing the lever arm 86 of the compound snap switch 87 to swing in such a manner to break the connection of the contact points 88 and 89 thereof. There is then, during this period, an electric circuit completed by the contact points 90 and 91 on the side of the snap switch 87, closed by the cam block 85, through the wires 92 and 93, through the stationary connections 94 and 95, adapted to receive the slidable connections 96 and 97 (as shown in the detail in Fig. 11), mounted on the carriage 31, and the wires 98 and 99 connected to the motor 49 which raises and lowers the mold 32. As soon as a circuit is completed by the proper contacting of the connections 94, 95, 96 and 97, the motor 49 starts and completes one uninterrupted revolution, during which time the rack bar 100, slidably associated with the yoke 45, causes the mold 32 to be lowered an amount equal to the length of slots 101 in the links 102, attached to the rack bar bearing 103. The slots 101 are of sufficient length to permit the mold, then suspended by the links, to dip a sufficient depth, by its own weight, into the molten glass 26. The rack bar 100 continues to travel downwardly a suitable distance A (clearly shown in Fig. 2), which distance completes the length of its downward stroke and also one-half of a revolution of the motor. The motor, still rotating, causes the rack bar to start back in the reverse direction, and after again having traversed the distance A, it picks up the yoke 45, thus causing the mold 32 to be raised out of the molten glass. The mold has had sufficient time to dwell in the molten glass during the period through which the rack bar traverses the distance A to permit the air to be exhausted from its compartment 51, and the glass sheet 56 to be formed therein. At the completion of the upward stroke of the rack bar 100, an electric circuit is momentarily completed by the stationary connection 104 and the connection 105, mounted on the carriage 31 (as shown in Fig. 3) and the wires 106 and 107 to the electric motor 41, causing the bevel gear 39 to rotate, thus putting the carriage 31 in translatory motion. As soon as the cam block 85 moves from beneath the snap switch lever arm 86, the spring 108 causes the contact points 88 and 89 to engage, and an electric circuit to the motor 41 is then completed through the wires 83 and 84. The circuit, through the wires 106 and 107 to the motor 41, is soon opened, as the connections 104 and 105 become separated shortly after the carriage 31 is in motion. After the bevel gear has completed one-half of a revolution and the carriage 31 has reached the end of its stroke, a second cam block 85′, mounted on the bevel gear, moves beneath the snap switch lever arm 86, separating the contact points 88 and 89, thus stopping the motor 41. A circuit to the motor 50 is simultaneously completed, when the carriage reaches the end of its stroke, by its connections 94′ and 95′ sliding into engagement with the connections 96 and 97, thus causing the mold 33 to be lowered into the molten glass. The apparatus then follows through the same cycle of operations as before.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In an apparatus for producing sheets of glass, comprising a receptacle containing molten glass, means for longitudinally indexing said receptacle, a plurality of annealing leers in close proximity thereto, a carriage elevated above said receptacle and leers, a plurality of members attached to said carriage, means for alternately dipping said members in the molten glass, means for forming sheets of glass, in said members, from said molten glass, reciprocatory means for conveying the sheets thus formed to their respective leers, means for removing said sheets from said members, and means for feeding said sheets into said leers.

2. In sheet glass apparatus, a receptacle containing molten glass, a plurality of molds adapted to dip down into the molten glass in reciprocatory order, means for forming therein sheets of glass by atmospheric pressure, a separate annealing leer for receiving the glass from each mold, and means for receiving the glass from the molds and transferring it to its respective leer.

3. In sheet glass apparatus, a receptacle containing molten glass, a plurality of molds adapted to alternately dip down into the molten glass, means for forming within the mold which has been dipped into the molten glass a sheet of glass by atmospheric pressure, a separate annealing leer for receiving the glass from each mold, and means for moving said molds to bring the one containing the sheet to a position adjacent its respective leer and the other to a position over the molten glass.

4. In sheet glass apparatus, a receptacle containing molten glass, a plurality of molds adapted to alternately dip down into the molten glass, means for forming within the mold which has been dipped into the molten glass a sheet of glass by atmospheric pressure, a separate annealing leer for receiving the glass from each mold, means for moving said molds to bring the one containing the sheet to a position adjacent its respective leer and the other to a position over the molten glass, and means for causing the mold containing the sheet to gradually swing from a vertical to a horizontal position during the conveying thereof from the receptacle to a position adjacent its respective leer.

5. In sheet glass apparatus, a receptacle containing molten glass, a pair of molds adapted to alternately dip down into the molten glass, means for forming within the mold which has been dipped into the molten glass a sheet of glass by atmospheric pressure, a separate annealing leer for receiving the glass from each mold, means for moving said molds to bring the one containing the sheet to a position adjacent its respective leer and the other to a position over the molten glass, and means for effecting the removal of the sheet from the one mold and transferring it to its respective leer while causing a sheet to be formed in the other mold.

6. In sheet glass apparatus, a receptacle containing molten glass, a plurality of molds adapted to dip down into the molten glass in reciprocatory order, means for forming therein sheets of glass by atmospheric pressure, a separate annealing leer for receiving the glass from each mold, means for reciprocating said molds to bring them alternately to a position over the molten glass and to a position adjacent their respective annealing leers, and means for causing the molds to swing from a vertical to a horizontal position upon movement in one direction and from a horizontal to a vertical position upon movement in the opposite direction.

7. In sheet glass apparatus, a receptacle containing a mass of molten glass, a plurality of mold members supported above the receptacle and adapted to be immersed within the molten glass in successive order, means for forming sheets of glass within the mold members during their period of immersion within the molten glass, an annealing leer, means for actuating the mold members to bring one of said members to a glass delivering position adjacent the leer and another of said members to a glass receiving position over the molten glass, and means for causing the mold member adjacent the leer to assume a substantially horizontal position and the mold member above the glass a substantially vertical position.

8. In sheet glass apparatus, a receptacle containing a mass of molten glass, a plurality of mold members supported above the receptacle and adapted to be immersed within the molten glass in successive order, means for forming sheets of glass within the mold members during their period of immersion within the molten glass, an annealing leer, means for actuating the mold members to bring one of said members to a glass delivering position adjacent the leer and another of said members to a glass receiving position over the molten glass, means for causing the mold member adjacent the leer to assume a substantially horizontal position and the mold member above the glass a substantially vertical position, means for immersing the mold member above the molten glass thereinto, and means for transferring the glass from the mold member adjacent the leer to said leer.

9. In sheet glass apparatus, a receptacle containing a mass of molten glass, a plurality of mold members supported above the receptacle and adapted to be immersed within the molten glass in successive order, means for forming sheets of glass within the mold members during their period of immersion within the molten glass, an individual annealing leer for receiving the glass from each mold member, and means for receiving the glass from the mold members and delivering it to the respective leers.

10. In sheet glass apparatus, a receptacle containing a mass of molten glass, a plurality of mold members supported above the receptacle and adapted to be immersed within the molten glass in successive order, means for forming sheets of glass within the mold members during their period of immersion within the molten glass, an individual annealing leer for receiving the glass from each mold member, and means for actuating the mold members to bring each of said members alternately to a position over the molten glass and adjacent its respective annealing leer.

11. In sheet glass apparatus, a receptacle containing a mass of molten glass, annealing leers positioned at opposite sides of the receptacle, a carriage movably mounted above said receptacle, a pair of vertically movable mold members carried by the carriage, and means for reciprocating said carriage to bring each of said mold members alternately to a position over the mass of molten glass and adjacent one of the annealing leers.

12. In sheet glass apparatus, a receptacle containing a mass of molten glass, annealing leers positioned at opposite sides of the receptacle, a carriage movably mounted above said receptacle, a pair of mold members carried by the carriage, means for reciprocating said carriage to bring each of said mold members alternately to a position over the mass of molten glass and adjacent one of the annealing leers, means for causing the mold member adjacent the leer to assume a substantially horizontal position and the mold member above the glass a substantially vertical position, and means for receiving the glass from the mold member adjacent the leer and for transferring it into said leer.

13. In sheet glass apparatus, a receptacle containing a mass of molten glass, a track upon which said receptacle is movably mounted, a plurality of mold members supported above the receptacle and adapted to be immersed within the molten glass in successive order, means for forming sheets of glass within the mold members during their period of immersion within the molten glass, means for indexing the receptacle along the track between the formation of successive sheets, and means for automatically reversing the direction of travel of the receptacle and returning it to its initial starting position at a predetermined time.

14. In sheet glass apparatus, a receptacle containing a mass of molten glass, a track upon which said receptacle is movably mounted, a plurality of mold members supported above the receptacle and adapted to be immersed within the molten glass in successive order, means for forming sheets of glass within the mold members during their period of immersion within the molten glass, driving means for indexing the receptacle along the track between the formation of successive sheets, and cam means operable automatically to reverse the driving means at a predetermined time to reverse the direction of travel of the receptacle and return it to its initial starting position.

Signed at Toledo, in the county of Lucas, and State of Ohio, this 29th day of March, 1926.

JOHN L. DRAKE.